Sept. 16, 1958 R. A. BARBEAU 2,852,076
TYPEWRITER CONTROLLED TAPE PUNCH
Filed Dec. 30, 1955 3 Sheets-Sheet 1
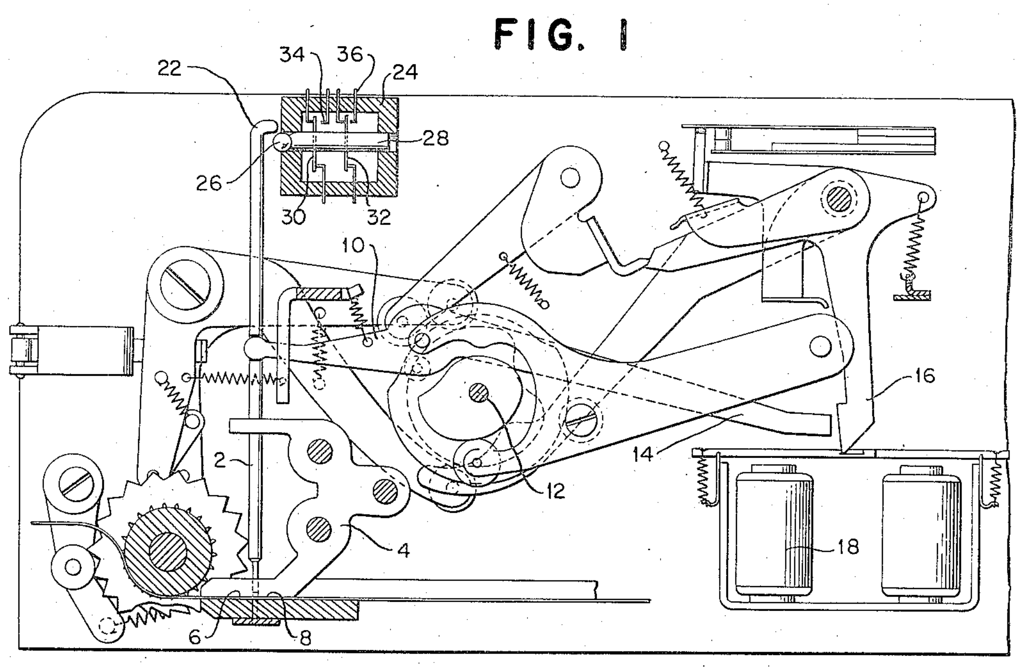
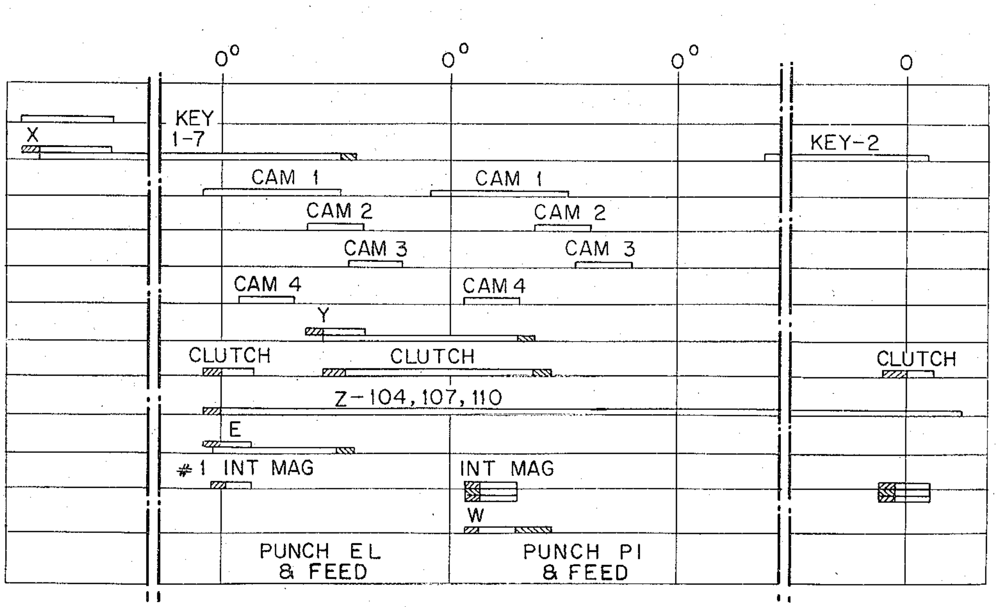
FIG. 3
INVENTOR
RAYMOND A. BARBEAU
BY [signature]
ATTORNEY Sept. 16, 1958 R. A. BARBEAU 2,852,076

TYPEWRITER CONTROLLED TAPE PUNCH

Filed Dec. 30, 1955 3 Sheets-Sheet 2

INVENTOR
RAYMOND A. BARBEAU

BY

ATTORNEY

United States Patent Office 2,852,076

Patented Sept. 16, 1958

2,852,076

TYPEWRITER CONTROLLED TAPE PUNCH

Raymond A. Barbeau, Poughkeepsie, N. Y., assignor to International Business Machines Corporation, New York, N. Y., a corporation of New York Application December 30, 1955, Serial No. 556,629

7 Claims. (Cl. 164—113)

Figure 2A:
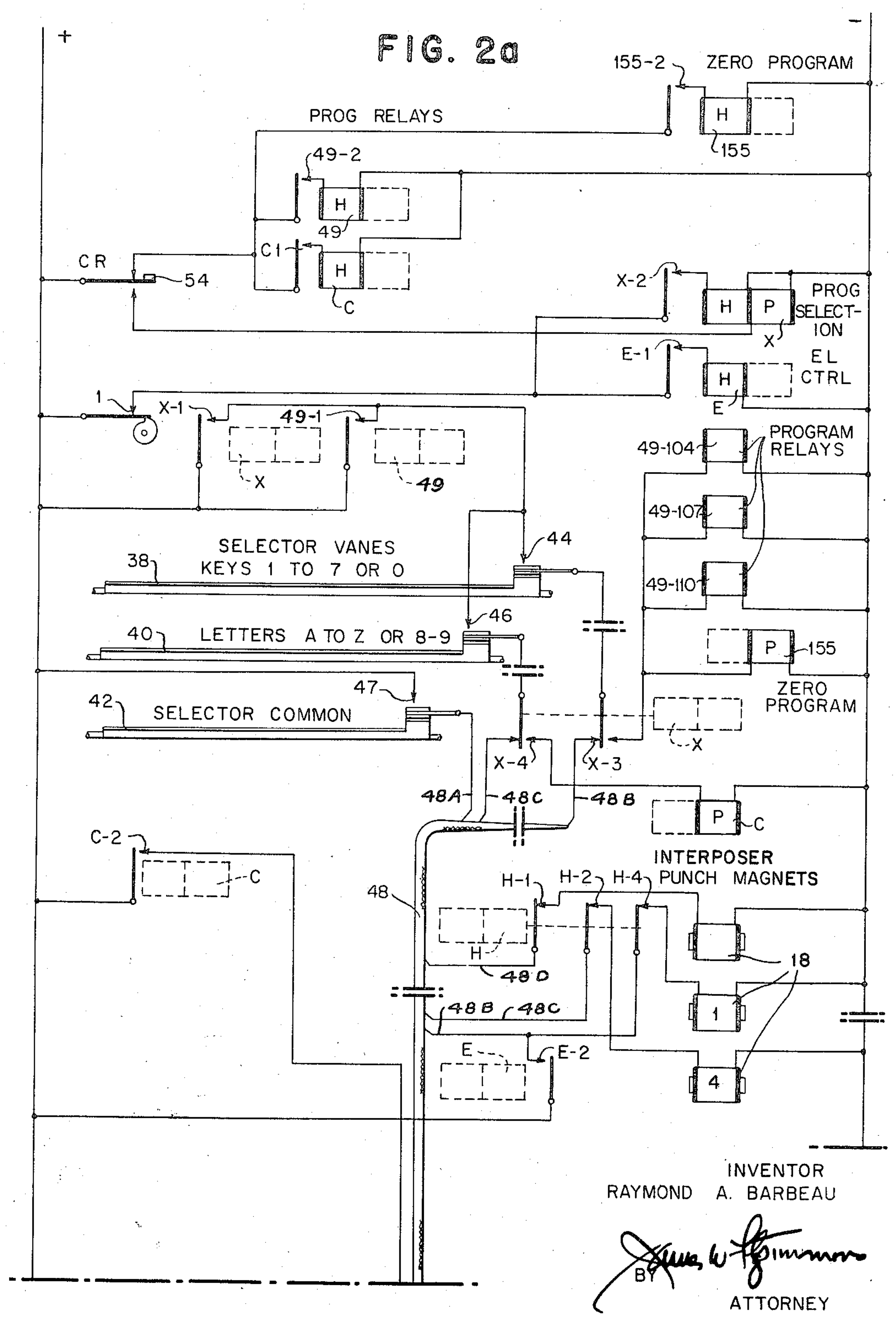

This invention relates to an improved typewriter controlled tape punch combination.

A typical program mechanism for use in conjunction with a typewriter tape punch is shown in co-pending application Serial No. 473,385, Patent No. 2,800,539 wherein for every print column of the typewriter platen, there is a corresponding column of a program tape located at a read station. The program tape acts as a column switch and it is a first object of this invention to provide circuitry for utilizing the program tape to effect a column controlled on-off condition for a tape punch.

It is a further object of this invention to provide an improved program selecting means.

It is a still further object of this invention to provide an improved program selecting means wherein a typewriter numeral key serves the dual function of selecting a program or operating a punch interposer magnet depending on the position of the typewriter carriage.

It is a still further object of this invention to provide an improved control circuitry for a typewriter tape punch wherein the typewriter keyboard will be locked up unless a predetermined program key is operated when typewriter carriage is in program position.

It is a still further object of this invention to provide an improved typewriter tape punch wherein after a program is selected while the carriage is in correct position, the carriage is automatically tabulated to a selected column.

It is a still further object of this invention to provide an improved typewriter tape punch wherein a simultaneous visual indication and electrical selection of a predetermined program is effected.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a side elevation of a paper tape punch.

Figure 2B:
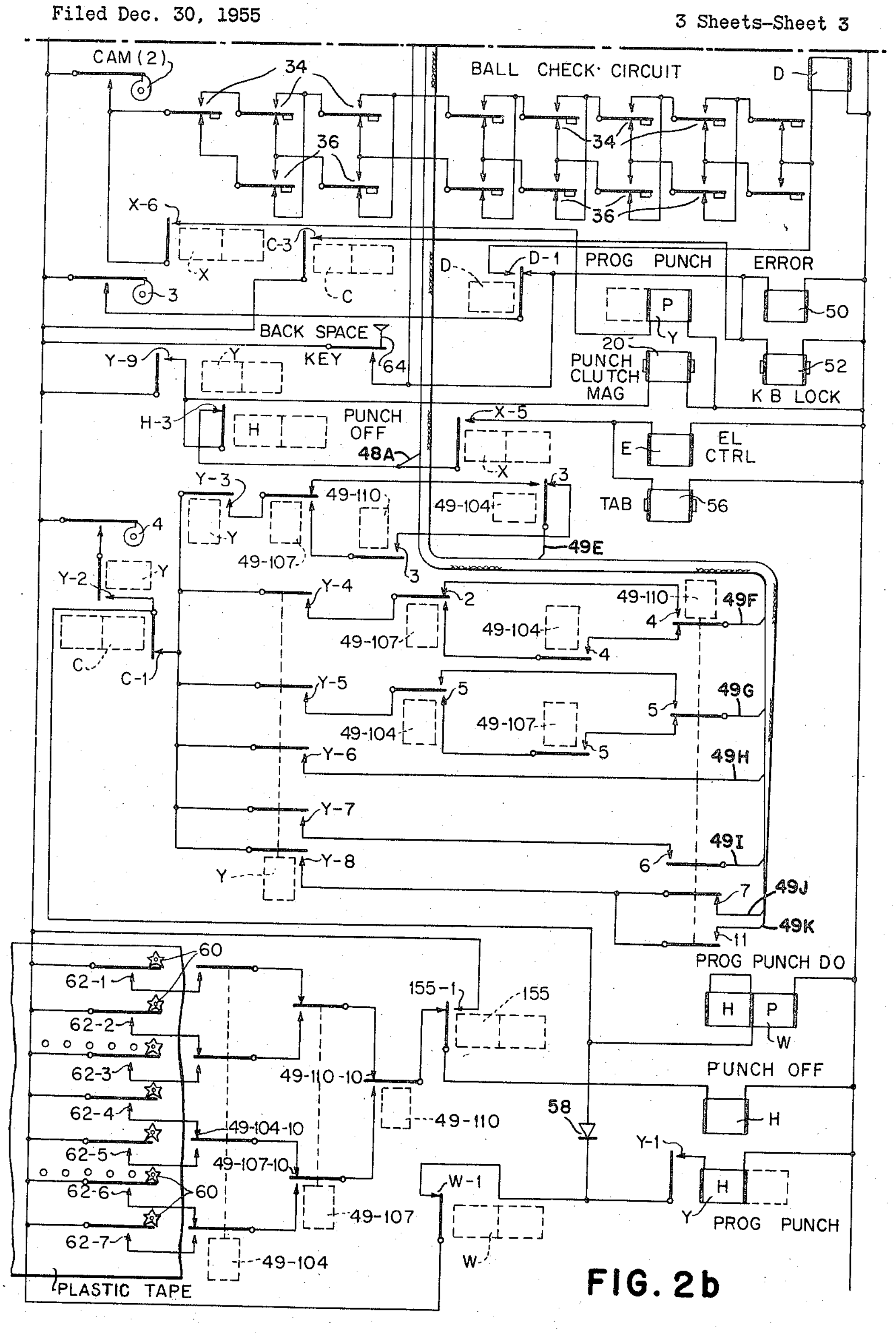

Figs. 2*a* and 2*b* comprise a schematic wiring diagram.

Fig. 3 is a sequence chart.

Briefly, this invention relates to an improved mechanism of the type shown in co-pending application Serial No. 250,647, Patent No. 2,784,785, Doty, wherein a typewriter controlled tape punch mechanism is described. Generally speaking, a typewriter is provided with a standard keyboard and standard type bars, but during a power driven type bar print stroke, a number of bails or vanes are selectively conditioned to close electrical contact points. The selector bails are conditioned according to a code so that for each key operated on the typewriter, a predetermined combination of electrical contacts are closed to establish electrical circuits. In a preferred embodiment, there are eight electrical contacts, of which seven are used for coding the pulses, while the eighth one called selector common, is closed for every key operation. A mechanism of this type is shown generally in Figs. 4, 5, 13 and 14 of the co-pending application Serial No. 250,647.

In normal operation, the pulses available through the selector bail contact points are sent directly to interposer punch magnets, which, under control of a one cycle clutch, will punch a code in a paper tape corresponding to those selector bail contacts which were closed by the type bar print stroke.

With reference to the drawing, and particularly Fig. 1, the operation of the paper punch which is well known in the art as shown in the co-pending application Serial No. 250,647 in United States Patent 2,540,027—Dodge, will be briefly described. The punch comprises a plurality of punch pins 2 which are slidably supported in a punch guide 4 for movement into and out of engagement with a tape 6 which passes over a punching station 8. The punch pins 2 are movable under control of actuating arms 10 which, in turn, are pivotally supported about a shaft 12 with each arm being provided with a tail 14. The actuating arms 10 are so supported that unless the tail 14 is held as by an interposer arm 16, then the punch pin will not penetrate the tape. The interposer arms 16, in turn, are under control of interposer magnets 18 which are energized selectively by the circuits including selector bail contacts. Hence a predetermined combination of interposer magnets 18 will be energized for each type bar print stroke.

The shaft 12 rotates in machine cycles i. e., one revolution under control of a punch clutch. The punch clutch is electrically energized by a magnet 20 shown on the wiring diagram (Fig. 2*b*). It is to be understood that every time the magnet 20 is energized, the punch machine will go through one cycle which means shaft 12 will go through one revolution and depending upon the tails of the interposers which have been hooked by the interposer arms 16, the corresponding punch pins 2 will perforate the tape 6 at that particular tape column lying at punch station 8. The one revolution of the shaft 12 also includes provision for feeding the tape to advance the next tape column to punch station 8 before the punch pins 2 perforate the tape for the next machine cycle.

The punch pins 2 are each provided with integral extensions 22 which are operably associated with a ball contact unit 24. When a particular punch pin is moved under control of its actuating arm 10, its extension 22 rides across a ball 26 in the ball contact unit 24 to move an individual plunger 28. Each plunger operates a pair of contact arms 30, 32 to control electrical contacts 34 and 36. Each of the contacts 34 and 36 have a normally open and a normally closed side, and it is to be understood that when a plunger 28 is moved by its extension 22, the contacts 34 and 36 associated with that particular punch pin will be transferred, described in detail in copending application Serial No. 556,643, filed December 30, 1955.

Since the operation of selector bails in response to a type bar print stroke is well known in the art, the selector bails are not completely described, but rather two sets of selector bails or vanes 38, 40 are schematically shown along with a selector common bail or vane 42 as operating respectively electrical contacts 44, 46, and 47. (Fig. 2*a*.)

It is to be recognized from this showing that when the character keys 1 through 7 or 0 are operated some multiple of vanes 38 will be operated to close their respective contacts 44 along with the selected common contact 47. The operation of the contacts 44 will provide pulses which may be sent to various relays or magnets as later described. Furthermore, when the letter keys a through *z* or 8, 9 are operated, some multiple of vanes 40 will be operated to close their respective contacts 46, along with selector common contact 47. These contacts, in turn, are operable to distribute pulses to various relays and magnets, as later described. The important thing to be understood is that the numeral keys will operate one set of contacts which is associated with the numeral keys while the letter keys control another set of contacts which is associated with the letter keys.

PROGRAMMING

It can be appreciated that provision should be made for selectively controlling the information that is punched in the tape. That is, the operator may not wish to enter all typed information in the tape, and rather than employ some manual control to effect this result, a program device is conventionally employed (as shown in co-pending application of Doty, Serial No. 250,647) to automatically regulate the data that will be punched in the tape.

In the Doty application, programming is under control of an auxiliary set of program keys which regulate the channel of the program unit that is to be operable. On the other hand, it has been mentioned that one of the objects of this improved invention is to use the numeral keys in the dual function of providing both tape punch control and program control. That is, in accordance with the principles of this invention, the numeral keys when operated, will always print the associated numeral on a work sheet carried by typewriter platen, but depending upon the position of the carriage the contact 44 operated by the numeral key will serve the function either of selecting a program, or conditioning the tape punch for code perforation.

Before explaining the dual function operation of the numeral keys, it should be mentioned that the typewriter is provided with an improved programming device of the type shown in co-pending application Serial No. 473,385 (Edminster and Shaver). That is, the typewriter is equipped with a program tape which is movable in conjunction with the typewriter carriage and as each column of the typewriter carriage reaches print position, a corresponding column of the program tape reaches a read station or position. At the read station, star wheels sense holes in the program tape to operate electrical contacts corresponding to the holes sensed.

The theory of operation of this improved mechanism is that the beginning of each typewritten line (e. g. left margin) is identified by a predetermined program numeral, corresponding to the row of the program tape that is operable to regulate the information in that line which is to be punched in the paper tape. The advantage of this visual program indication is that it helps in checking operator errors. If the operable program row has a hole in the tape at the column in tape read position, a pulse will be supplied, as later described, to place the paper tape punch in a punch off condition. If there is no hole in the program tape for the column at the read station, all the information printed, will be entered into the paper tape.

*Program selection*

In operating this machine, program selection is made (while the carriage is in its left hand margin position) for each individual line of typing. To accomplish this, the typewriter carriage return key is operated to return the carriage to its left hand margin position, and then one of the numeral key 1 through 7 must be operated, or else the keyboard will lock-up. In order to explain the need for this conditioning, reference is now made to the wiring diagram, Figs. 2*a* and 2*b*.

The operation of any type bar actuates selector common bail 42 to close contact 47 thereby providing a pulse through a line 48A in a cable 48 to the normally closed contact H–3 to the punch clutch magnet 20 thereby sending shaft 12 through one complete revolution. Shaft 12, in addition to controlling tape punching and tape feed is equipped with a plurality of cams, such as cams 1, 2, 3, 4 which close electrical contacts and hold them closed for a portion of the cycle as shown relatively in the sequence chart of Fig. 3.

It will be recognized that the depression of the key which closed the selector common contact 47 also would have closed either the contacts 44 or 46, and then depending upon the condition of the contacts X–3; X–4, establish a circuit either into lines 48B and 48C of the cable 48, or to program relays 49. In the illustrated embodiment X–3; X–4 are at their normally closed side thereby closing a circuit into cable 48 and hence to corresponding interposer magnets 18 shown in Fig. 2*a*. However, since program contacts X–1, or 49—1 are not closed, a pulse is not available to the interposer magnets 18, and accordingly, even though the punch clutch was triggered to send the shaft 12 to one operation, no information is punched in the tape. During the cycle of the shaft 12, however, cam 2 closed an electrical contact to send a pulse through the contacts 34 and 36 of the ball check unit 24, and since no interposers were energized, no pins perforated the tape, and all the contacts 34 and 36 would be in the condition shown in Fig. 1 and, therefore, the check relay D would not be energized. Later in the same cycle, when a pulse is available through the cam 3, it will pass through the contact D–1 normally closed to energize both the error relay 50 and the keyboard lock relay 52.

Then, with the keyboard lock relay 52 energized, if the carriage return key 54 is closed, the typewriter carriage will be returned to the left hand margin position, and simultaneously send a pulse to the program selection relay X which has a hold circuit through its own contact point X–2, through the normally closed cam 1 contact back to the positive side of the line. With the program relay X energized, if the operator does strike one of the numeral keys (1 through 7), the following operation will take place: A pulse will be available from the positive side of the line through the X–1 contact point normally open now closed through the contact 44 which is closed in response to the operation of the keys 1 through 7, through the X–3 contact point normally open now closed to pulse some one or combination of the program relays 49—104; 107; 110. Simultaneously, the operation of the numeral keys 1 through 7 would close the selector common contact 47 sending a pulse through line 48A and the H–3 contact point normally closed to the punch clutch 20 thereby initiating a punch clutch cycle. Further, a pulse is available from the selector common contact 47 through the line 48A and the X–5 contact (Fig. 2*b*) normally open now closed to the end of line control relay E and in parallel to the tab solenoid 56. This latter solenoid is positioned in the typewriter under the tabulation key lever and functions to initiate a typewriter tab operation into a predetermined column as set by a conventional tab stop.

Once the end of line control relay E has been energized, a hold circuit is available (Fig. 2*a*) through its own contact point E–1 through the number 1 normally closed cam contact 1 to the positive side of the line. With the E relay energized, a pulse is available from the positive side of the line in Fig. 2*a* through the E–2 contact point through the H–4 contact point normally closed to the number one interposer magnet so that a number one hole will be punched in the paper tape when the punch clutch goes through a cycle of operation, and the number one hole has been selected as indicating the end of the previous line or the beginning of a new line of information. During that cycle wherein the number one hole is punched in the tape, cam 2 will make (Fig. 2*b*) sending a pulse through the X–6 contact point normally open, now closed, to the program punch relay Y. A hold circuit is then available for the program punch relay Y through its own normally open contacts point Y–1 normally open, now closed, and through W–1 contact point normally closed back to the positive side of the line. It can be recognized from the sequence chart that during the punch cycle wherein the one hole is punched in the tape, cam 1 will open and the end of line control relay E will drop out along with the program selection relay X. At the end of that one-hole cycle, a second pulse is available to the punch clutch magnet 20 through the contact point Y–9 normally open, now closed, which will send the machine through another punch cycle. During this second cycle, the purpose is to punch in the paper tape a program indication which depends upon the program level selected by the program relays 49—104; 107; 110. Incidentally, the program relays 49 are held energized after selection through a 49 hold relay and through the 49–2 contact point normally open, now closed to the normally closed point of the carriage return cam contact 54.

The sequence chart shows that a cam 4 makes near the beginning of a punch cycle and, therefore, during the second cycle when cam 4 makes, a pulse is available through the Y–2 contact point (Fig. 2*b*) normally open, now closed through the C–1 normally closed contact point to the Y–3, 4, 5, 6, 7, 8 contact points normally open, now closed, through some combination of the 49—110, 107, 104 contact points normally open, now closed, through some combination of lines 49E through K of the cable 49 to the corresponding interposer magnets 18 tripping them off in order to punch the corresponding program indication code in the paper tape during the second cycle. Also, at the beginning of the second cycle when cam 4 makes, a pulse is available through Y–2 normally open, now closed to the program punch drop out relay W and a parallel circuit through rectifier 58 and Y–1 contact point normally open, now closed to the program punch hold relay Y to the negative side of the line. The program punch drop out relay has its own hold coil which is shorted so that by transformer action, it will cause a very slow drop out of the relay W when the pulse is no longer available at the pick up coil through the opening of the number 4 cam. At the end of cam 4 time, the program punch relay Y will drop out, but because of the slow drop out of the program punch drop out relay W, the normally closed W–1 contact point will be open long enough to effect the drop out of the Y hold relay.

During the second cycle after the Y relay is deenergized, the Y–9 contact point (Fig. 2*b*) will open thereby deenergizing the punch clutch 20. Therefore, at the end of the second machine cycle, the punch clutch will be deenergized and the tape punch will stop.

It will be noted that the program relays 49—104, 107 and 110 will stay energized through the hold circuit described via the normally closed point of carriage return contact 54, until such time as the carriage return key is again operated.

With respect to the program tape which moves in conjunction with the typewriter carriage, the program relays 49—104, 107, 110, depending upon their energization will establish a circuit (Fig. 2*b*) across the star wheels 60 and their respective contacts 62 through the normally closed point 155–1 of the program 0 relay 155 to the punch off relay H.

It will be understood that the selective energization of the program relays 49–104, 107 and 110 will establish a circuit through only one of the contacts 62. For example, if the 49–104 and the 49–110 relay had been energized then program 5 star wheel will be operative through contact 62—5. That is, the program level will be 5 and the five row in the program tape will control the operation of the punch off relay H because each time the star wheel 60—5 reads a hole in the tape, the contact 62—5 will be closed to provide a pulse through the contact 49—104—10 normally open, now closed, through the contact 49—107—10 normally closed, through the contact 49—110—10 normally open, now closed, through contact 155—1 normally closed to punch off relay H. The interposer magnets 18 (Fig. 2*a*) are energized under control of H contact points such as H–1, H–2 and H–4 with one normally closed H contact point being in each interposer magnet circuit. Therefore, when the punch off relay H is energized, no pulses are available to the interposer magnets 18, nor is any pulse available to the punch clutch magnet 20 since the contact H–3 will be open. Accordingly, the type bar will print, but since the 5 hole is read in the program tape at the program tape read station, the corresponding information will not be punched in the tape.

Since there is an individual position of the program tape for each column of the typewriter carriage, the tape punch is operable under individual columnar control for each program level established. That is, for every type bar print stroke, until the next carriage return operation, the following operation will take place. Since the 49—1 contact is now closed, a pulse is available through 49—1 to either the 44 or 46 contact points to the respective X–3 normally closed or the X–4 normally closed contact points into the cable 48 on the lines 48B and 48C and then to the interposer magnets 18. Concurrently, a pulse is available through the selector common contact 47 to the punch clutch magnet 20. Therefore, for each key lever operation, corresponding information will be punched in the tape unless the program level selected has energized the punch off relay H whereupon the information will be typed, but not entered into the paper tape.

*Zero programming*

The purpose of zero programming is to turn off the tape punch for an entire line of operation; i. e. remove it from control of the program tape. If after a carriage return operation, which opened the contacts 54 to drop out all of the program relays held up from the previous line of typing, and set up the program selection relay X for the next line, the zero type bar key is depressed, a pulse is available through the X–1 contact point normally open, now closed, through the 44 contact point, through the X–3 normally open, now closed to a zero program relay 155 (Fig. 2*a*). This relay is held up through its own contact point 155—2 and through the normally closed carriage return contact 54 to the positive side of the line. The energization of relay 155 transfers the contact point 155—1 to its normally open side thereby establishing a circuit from the positive side of the line, through 155—1 normally open, now closed to the punch off relay H. With this circuitry, it is apparent that until the next carriage return operation, the punch off relay H will control the operation of the tape punch and no information will be punched in the paper tape.

*Mis-programming*

If after a carriage return operation, with the program selection relay X energized, the operator hits a key other than 1–7 or 0, the following circuit will be energized. A pulse is available through X–1 normally open, now closed to the 46 contact point through the X–4 normally open, now closed to the mis-programming relay C. The mis-programming relay C has a hold circuit (Fig. 2*a*) through its own contact point C–1 through the normally closed carriage return contact point 54 to the positive side of the line. The energization of this mis-programming relay C provides a pulse through the C–3 (Fig. 2*b*) contact point normally open, now closed to the keyboard lock magnet to the negative side of the line thereby holding the keyboard locked and preventing any further depression of keyboard except for carriage return key, which, as heretofore mention, will clear the keyboard when operated.

*Error control*

At any time during the typing of a line of information, if the operator notes an error, she follows the following procedure: First, she hits the backspace key 64 to establish a circuit to the error relay 50 and the keyboard lock relay 52. Then, as completely described in co-pending application Serial No. 556,643 when the operator closes the carriage return key 54 (through circuitry, not shown, in this application), a sequence of events will take place wherein an auto feed signal followed by an error signal will be entered into the tape. Then the operator reprograms the line and types it over.

Furthermore, during each punch cycle, a pulse is available at cam 2 through the contacts 34, 36 of the ball check unit 24. These contacts are so arranged that a predetermined pattern must be established (e. g. odd number of holes punches) to energize the D relay and unless the D relay is energized each cycle, then at cam 3 time, a pulse will be available through the normally closed contact D–1 to energize the error relay 50 and keyboard lock magnet 52.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an apparatus having a movable carriage, a program tape having a column corresponding to each column on said movable carriage and having a plurality of rows of said columns including means reading said program tape for each of said rows at a column corresponding to its respective carriage column keyboard controlled means for printing selected characters on a copy sheet carried by said carriage including a plurality of control keys effective to print selected characters when actuated, each of said control keys associated with one of said rows on said program tape, a carriage return mechanism operable under control of a carriage return key for restoring the carriage to a left hand margin position, and punch control circuit including punch magnets normally operable in response to the selected character printing mechanism for punching corresponding data representing designations into a record sheet, and a mechanism for selectively interrupting said punch control circuitry to prevent the operation of said punch during character printing operation comprising punch circuit interrupting means associated with said program tape rows operable when conditioned by a corresponding one of said control keys to interrupt said punch control circuitry, and means responsive to the operation of said program tape reading means for conditioning said punch circuit interrupting means when a predetermined signal is detected in said program tape.

2. In an apparatus having a movable carriage, keyboard controlled means for printing selected characters on a copy sheet carried by said carriage, a carriage return mechanism operable under control of a carriage return key for restoring the carriage to a left hand margin position, punch control circuitry including punch magnets normally operable in response to the selected character printing mechanism for punching corresponding data representing designations into a record sheet, and a plural row program tape having a column corresponding to each column on said movable carriage including means reading all of said program rows at the column corresponding to the column being printed, a mechanism operable under control of a selected program tape row for all carriage columns in a predetermined copy sheet field to interrupt said punch control circuitry to prevent the operation of said punch comprising circuit interrupting means operable when conditioned to interrupt said punch control circuit, means responsive to a carriage return operation for conditioning said mechanism for program row selection, means responsive to the first character printing operation after said carriage return operation for selecting the program row which is to be operable as said carriage traverses said predetermined copy sheet field and means responsive to the detection of a predetermined condition in said selected program tape row by said reading means while said carriage traverses said predetermined copy sheet field for conditioning said punch circuit interrupting means.

3. In an apparatus having a movable carriage, keyboard controlled means for printing selected characters on a copy sheet carried by said carriage, a carriage return mechanism operable under control of a carriage return key for restoring the carriage to a left-hand margin position, punch control circuitry including punch magnets normally operable in response to the selected character printing mechanism for punching corresponding data representing designations into a record sheet, and a plural row program tape having a column corresponding to each column on said movable carriage including means reading all of said program rows at the column corresponding to the column being printed, a mechanism operable under control of a selected program tape row for all carriage columns in a predetermined copy sheet field to interrupt said punch control circuitry to prevent the operation of said punch comprising circuit interrupting means operable when conditioned to interrupt said punch control circuit, means responsive to a carriage return operation for conditioning said mechanism for program row selection, means responsive to the first character printing operation after said carriage return operation for selecting the program row which is to be operable as said carriage traverses said predetermined copy sheet field, means responsive to the detection of a predetermined condition in said selected program tape row by said reading means while said carriage traverses said predetermined copy sheet field for conditioning said punch circuit interrupting means, and means responsive to a program row selection for conditioning said punch control circuitry to punch a corresponding program designation in said record, said program responsive punch control circuitry conditioning means comprising contacts operable by said program relays to establish individual circuits to energize corresponding punch magnets whereby after a carriage return operation a selected program tape row designation is printed on the copy sheet and simultaneously punched in the record.

4. In an apparatus having a movable carriage, keyboard controlled means for printing selected characters on a copy sheet carried by said carriage, a carriage return mechanism operable under control of a carriage return key for restoring the carriage to a left hand margin position, punch control circuitry including punch magnets normally operable in response to the selected character printing mechanism for punching corresponding data representing designations into a record sheet, and a plural row program tape having a column corresponding to each column on said movable carriage including means reading all of said program rows at a column corresponding to the carriage column being printed, a mechanism responsive to a selected program tape row for interrupting said punch control circuitry to prevent the operation of said punch when said printing mechanism is operated comprising punch circuit interrupting means operable when conditioned to interrupt said punch control circuitry, individual circuit means for a selected program tape row to condition said circuit interrupting means when said program tape read means detects a predetermined condition, means responsive to a carriage return operation for conditioning program row selection circuitry, and means responsive to the first operation of said character printing mechanism of one of a selected group of characters for determining which program row is to be operable to condition said punch circuit interrupting means.

5. In an apparatus having a movable carriage, keyboard controlled means for printing selected characters on a copy sheet carried by said carriage, a carriage return mechanism operable under control of a carriage return key for restoring the carriage to a left hand margin position, punch control circuitry including punch magnets normally operable in response to the selected character printing mechanism for punching corresponding data representing designations into a record sheet, and a plural row program tape having a column corresponding to each column on said movable carriage including means reading all of said program rows at a column corresponding to the carriage column being printed, a mechanism responsive to a selected program tape row for interrupting said punch control circuitry to prevent the operation of said punch when said printing mechanism is operated comprising punch circuit interrupting means operable when conditioned to interrupt said punch control circuitry, individual circuit means for a selected program tape row to condition said circuit interrupting means when said program tape read means detects a predetermined condition, means responsive to a carriage return operation for conditioning program row selection circuitry, means responsive to the first operation of said character printing mechanism of one of a selected group of characters for determining which program row is to be operable to condition said punch circuit interrupting means, a keyboard lock solenoid, and misprogramming means responsive to the first operation of said character printing mechanism for any character other than said selected group after a carriage return operation for energizing said keyboard lock solenoid.

6. In an apparatus having a movable carriage, keyboard controlled means for printing selected characters on a copy sheet carried by said carriage, a carriage return mechanism operable under control of a carriage return key for restoring the carriage to a left hand margin position, punch control circuitry including punch magnets normally operable in response to the selected character printing mechanism for punching corresponding data representing designations into a record sheet, and a plural row program tape having a column corresponding to each column on said movable carriage including means reading all of said program rows at a column corresponding to the carriage column being printed, a mechanism responsibe to a selected program tape row for interrupting said punch control circuitry to prevent the operation of said punch when said printing mechanism is operated comprising punch circuit interrupting means operable when conditioned to interrupt said punch control circuitry, individual circuit means for a selected program tape row to condition said circuit interrupting means when said program tape read means detects a predetermined condition, means responsive to a carriage return operation for conditioning program row selection circuitry, means responsive to the first operation of said character printing mechanism of one of a selected group of characters for determining which program row is to be operable to condition said punch circuit interrupting means, a keyboard lock solenoid, misprogramming means responsive to the first operation of said character printing mechanism for any character other than said selected group after a carriage return operation for energizing said keyboard lock solenoid, and means responsive to a carriage return operation for releasing said keyboard after it has been locked through misprogramming.

7. In an apparatus having a movable carriage, keyboard controlled means for printing selected characters on a copy sheet carried by said carriage, a carriage return mechanism operable under control of a carriage return key for restoring the carriage to a left hand margin position, punch control circuitry including punch magnets normally operable in response to the selected character printing mechanism for punching corresponding data representing designations into a record sheet, and a plural row program tape having a column corresponding to each column on said movable carriage including means reading all of said program rows at the column corresponding to the column being printed, a mechanism operable under control of a selected program tape row for all carriage columns in a predetermined copy sheet fiield to interrupt said punch control circuitry to prevent the operation of said punch comprising circuit interrupting means operable when conditioned to interrupt said punch control circuit, means responsive to a carriage return operation for conditioning said mechanism for program row selection, means responsive to the first character printing operation after said carriage return operation for selecting the program row which is to be operable as said carriage traverses said predetermined copy sheet field, means responsive to the detection of a predetermined condition in said selected program tape row by said reading means while said carriage traverses said predetermined copy sheet field for conditioning said punch circuit interrupting means, means responsive to the operation of said punch control circuitry for determining whether or not a predetermined punch pattern has been satisfied, and circuit means responsive to the failure of said predetermined pattern being satisfied for locking said keyboard.

References Cited in the file of this patent

UNITED STATES PATENTS

| | | |
|---|---|---|
| 1,780,610 | Weinlich | Nov. 4, 1930 |
| 1,843,772 | Lasker | Feb. 2, 1932 |
| 2,046,082 | Mills | June 30, 1936 |
| 2,390,486 | Doty | Dec. 4, 1945 |
| 2,540,029 | Hamilton et al. | Jan. 30, 1951 |